(No Model.)

M. HOGAN.
AUTOMATIC VALVE FOR WATER CLOSETS.

No. 248,862. Patented Nov. 1, 1881.

Witnesses.
Edwin F. Dimock.
Clarence K. Wooster.

Inventor.
Matthew Hogan
by Theo. G. Ellis, Attorney

United States Patent Office.

MATTHEW HOGAN, OF HARTFORD, CONNECTICUT, ASSIGNOR TO THE HARTFORD SANITARY PLUMBING COMPANY, OF SAME PLACE.

AUTOMATIC VALVE FOR WATER-CLOSETS.

SPECIFICATION forming part of Letters Patent No. 248,862, dated November 1, 1881.

Application filed June 13, 1881. (No model.)

*To all whom it may concern:*

Be it known that I, MATTHEW HOGAN, of Hartford, in the county of Hartford and State of Connecticut, have invented certain new and useful Improvements in Automatic Valves for Water-Closets, &c.; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to valves or water-cocks adapted to be used for supplying water-closets, or for other similar purposes where it is desirable to have the valve self opening and closing by the operation of a small subsidiary valve, and to continue to discharge through the main valve after the closing of the subsidiary small valve, which is operated by suitable mechanism a certain time in advance.

The object of my invention is to provide a valve of more certain and positive action under all different pressures of water in the supply-pipes than has heretofore been in use, and one which will be less likely to get out of order and become deranged by continued wear.

Another object of my invention is to provide for the waste-water that is released to cause the valve to operate and conduct it into a proper receptacle.

Figure 1:
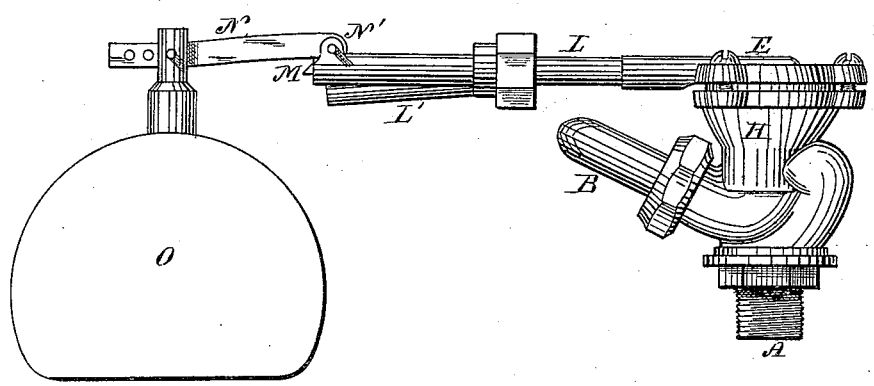
Figure 2:
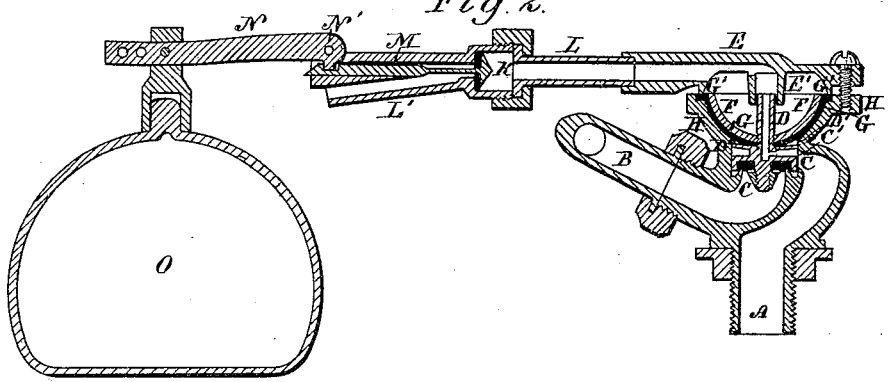
Figure 3:
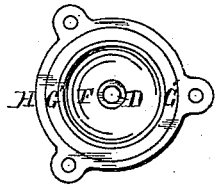
Figure 4:
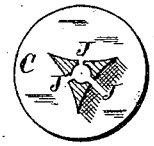

In the accompanying drawings, illustrating my invention, Figure 1 is an outside view of my improved valve and its connections, showing the parts arranged as adapted to be placed in a water-closet. Fig. 2 is a longitudinal sectional view of the same. Fig. 3 is a top view of the valve-box with the top plate removed. Fig. 4 is an enlarged sectional view through the valve-stem just above the main valve which closes the pipe.

A is the inlet, communicating with the water-main or other source of supply. B is the exit-pipe leading to the bowl of the water-closet or other point of delivery. C is a valve fitting on a valve-seat at the junction of these pipes, and furnished with a rubber or other packing in the customary manner. This packing is shown at C' in the drawings.

D is the valve-stem. It passes upward from the valve, and its top enters into the guide E' in the top plate, E. At the lower end of the valve-stem, just above the valve, is a flange, D', which fits loosely in the recess above the valve-seat, and serves to guide the valve.

F is a cup, of a nearly hemispherical form, attached to the valve-stem, and lying in a similarly-shaped recess in the valve-chamber H.

G is a packing-cup, preferably made of pure rubber, fitting between the metallic cup F and the cup-shaped recess in the valve-chamber H. This packing is provided with an aperture in the bottom, fitting upon the valve-stem, and the cup F screws down upon it, so as to clip and hold it against the flange D'. The upper edge of the packing G is furnished with a rim or flange, G', which is clipped between the cover E and the valve-chamber H, so as to form a water-tight joint.

J J J are three small openings communicating from the space above the valve and below the flange D', which is in connection with the inlet-pipe A, to the interior of the hollow valve-stem D, which is open at the top, and is in communication with the space above the cup F and the rubber packing G. There may be more or less in number than three of the small apertures J; but three is preferred, as they can be made short and less likely to become stopped, while leaving at the same time sufficient material in the valve-stem, as shown in section in Fig. 4.

K is a subsidiary or trip-valve for operating the main valve between the supply and delivery pipes, that has been before described. This trip-valve is placed in the pipe L, which communicates with the space in the valve-chamber above the cup F. It is provided with a stem, M, which is moved forward or back through a short distance by means of the lever N, hinged at N', and which has a short arm entering into a suitable socket in the stem M.

O is a float for raising or lowering the outer or longer arm of the lever N, although this can be done by any other suitable mechanical means, or by hand, if desired. The float O is the means best adapted for use with water-closets. It is situated in a chamber connected with the bowl in such a manner that when the water is sufficiently high the float lifts the lever and closes the valve K, and when it lowers the float falls and opens the same valve.

L' is a continuation of the pipe L beyond the valve, to conduct what water passes through it into the chamber which contains the float O.

The operation of my improved valve is as follows: When the outer end of the lever N is depressed by the lowering of the float, or otherwise, the valve K is opened and the water in the pipe L flows out through L', thus relieving the pressure in the valve-chamber H above the cup F. The opening through the trip-valve K being much greater than the small holes J, the water flowing through them does not interfere with this, and the pressure from the inlet-pipe A forces up the rubber packing G and the cup F, thereby lifting the main valve C and allowing the water to pass freely into the delivery-pipe B. When the outer end of the lever N is again raised it closes the valve K. This allows the water passing through the small holes J to gradually fill the upper part of the main-valve chamber above the cup F, by which the valve is gradually closed until the pressure above the valve is restored, when the flow from the delivery-pipe stops. The length of time that the main valve remains open after the trip-valve is closed is regulated by the size of the openings J. The smaller they are the longer will the valve remain open. While the trip-valve K is open the small amount of water passing through the holes J continues to flow, and falls out from the pipe L' into the float-chamber. In the drawings the pipe A is shown as the inlet-pipe and the pipe B as the delivery-pipe, but they can be reversed and the valve operate in the same manner. In this latter case the holes J pass through the valve and communicate with the pipe B instead of with A, as shown. Although my improved valve is especially adapted for use with water-closets, it is also adapted for automatic or self-closing faucets. The trip-valve in this case would be opened by hand and closed with a spring. The trip-valve can also be operated entirely by hand, if desired.

What I claim as my invention is—

1. The combination of the valve C, the hollow stem D, provided with the openings J, the cup F, the cup-shaped packing G, and the valve-chamber H, provided with a cup-shaped recess, substantially as described.

2. In an automatic valve, the cup-shaped rubber packing G, secured to the valve-stem at the middle and to the valve-chamber at its rim, in combination with said stem and chamber and the cup F, substantially as described.

3. In an automatic water-cock, the combination of a trip-valve, K, with the main valve, composed of the cup F, packing G, valve C, packing C', stem D, and guide E', said main valve being operated by the pressure of the supply-water let on or released above the valve by the closing or the opening of the trip-valve, substantially as described.

4. The combination of the valve K in the pipe L, having the separate discharge-pipe L', the stem M, the lever N, and the float O, as a device for operating the automatic valve mechanism of a water-delivering cock, substantially as described.

MATTHEW HOGAN.

Witnesses:
HENRY S. LORD,
THEO. G. ELLIS.